US008739061B1

(12) United States Patent
Manning et al.

(10) Patent No.: US 8,739,061 B1
(45) Date of Patent: May 27, 2014

(54) METHOD AND APPARATUS FOR OUTPUT OF SEARCH RESULTS

(75) Inventors: Craig Nevill Manning, New York, NY (US); Pearl Renaker, San Francisco, CA (US)

(73) Assignee: Google Inc., Mountain View, CA (US)

( * ) Notice: Subject to any disclaimer, the term of this patent is extended or adjusted under 35 U.S.C. 154(b) by 32 days.

(21) Appl. No.: 13/163,413

(22) Filed: Jun. 17, 2011

Related U.S. Application Data

(63) Continuation of application No. 10/673,957, filed on Sep. 29, 2003, now Pat. No. 8,006,197.

(51) Int. Cl.
*G06F 3/048* (2013.01)
*G06F 17/30* (2006.01)
*G06F 3/00* (2006.01)
*G06F 3/0482* (2013.01)

(52) U.S. Cl.
CPC ...... *G06F 17/3005* (2013.01); *G06F 17/30979* (2013.01); *G06F 17/30023* (2013.01); *G06F 3/0482* (2013.01)
USPC ........... 715/788; 715/764; 715/783; 715/792; 715/836

(58) Field of Classification Search
CPC .......... G06F 17/3005; G06F 17/30979; G06F 17/30023; G06F 3/0482
USPC .......................... 715/764, 783, 788, 792, 838
See application file for complete search history.

(56) References Cited

U.S. PATENT DOCUMENTS

| | | | | |
|---|---|---|---|---|
| 5,982,369 A * | 11/1999 | Sciammarella et al. | ....... | 715/835 |
| 6,058,417 A * | 5/2000 | Hess et al. | ..................... | 709/219 |
| 6,141,653 A | 10/2000 | Conklin et al. | | |
| 6,260,024 B1 | 7/2001 | Shkedy | | |
| 6,271,840 B1 * | 8/2001 | Finseth et al. | ................. | 715/236 |
| 6,369,840 B1 * | 4/2002 | Barnett et al. | ................. | 715/853 |
| 6,496,857 B1 * | 12/2002 | Dustin et al. | ................... | 709/219 |
| 6,732,161 B1 * | 5/2004 | Hess et al. | ..................... | 709/219 |
| 6,754,636 B1 | 6/2004 | Walker et al. | | |
| 7,013,285 B1 * | 3/2006 | Rebane | ......................... | 705/7.31 |
| 7,076,443 B1 * | 7/2006 | Emens et al. | .............. | 705/14.55 |
| 7,082,409 B1 * | 7/2006 | Cherry | ......................... | 705/27.1 |
| 2002/0161658 A1 * | 10/2002 | Sussman | ........................ | 705/26 |
| 2002/0178074 A1 | 11/2002 | Bloom | | |
| 2005/0010484 A1 * | 1/2005 | Bohannon et al. | .............. | 705/26 |
| 2005/0065806 A1 * | 3/2005 | Harik | ................................ | 705/1 |

OTHER PUBLICATIONS

"FirePoppy, Broker Pro.," FirePoppy, Inc., 1 page, [Archived on web.archive.org on Aug. 22, 2003; Retrieved on May 19, 2011] Retrieved from the internet <URL:http://replay.web.archive.org/20030822021619/http://www.firepoppy.com/broker_pro.phtml>.

(Continued)

*Primary Examiner* — Nicholas Augustine
(74) *Attorney, Agent, or Firm* — Johnson, Marcou & Isaacs, LLC

(57) ABSTRACT

Methods and systems for generating search results for output to a user. A number of "views" of search results may be provided each having particular formats. In a product search engine implementation, a grid view may be provided that allows multi-column display of product-related search results. In other implementations, a user may be able to select between multiple output modes/formats, and may even be able to select how search results should be output (e.g., what type and format of cues should be output for each search result).

6 Claims, 5 Drawing Sheets

(56) References Cited

OTHER PUBLICATIONS

"Shopatron FAQ," FirePoppy, Inc., 3 pages, [Archived on web.archive.org on Jan. 17, 2004; Retrieved on May 19, 2011] Retrieved from the internet <URL:http://replay.web.archive.org/20040117021450/http://www.firepoppy.com/FAQ.phtml>.

Letter from Ed Stevens, Fire Poppy, Inc. to Jim Hudson, Sullivan Products, dated Sep. 12, 2000, 6 pages.

Screenshots Shopatron (#1-#7), Shopatron, Ltd. 1999, 7 pages, [retrieved from the internet on Aug. 10, 2000] Retrieved from the internet <http://shopatron.ooi.net/shopping_cart.phtml>; <http://shopatron.ooi.net/checkout1.phtml>; <http://shopatron.ooi.netlcheckout3.phtml?multi=>;<http://shopatron.ooi .netlcheckout4.phtml>.

\* cited by examiner

METHOD AND APPARATUS FOR OUTPUT OF SEARCH RESULTS

CROSS-REFERENCE TO RELATED APPLICATIONS

This application is a continuation of U.S. patent application Ser. No. 10/673,957, filed Sep. 29, 2003, which is incorporated by reference herein in its entirety.

FIELD OF THE INVENTION

The present invention relates to the field of information retrieval systems such as search engines, and more particularly, to methods and systems for outputting (e.g., for display) search results generated by search engines.

BACKGROUND OF THE INVENTION

Improving mechanisms for searching vast numbers of documents, such as that available via the World Wide Web ("web"), for information has increasingly been an area of focus and research. This is especially due to the continued growth in the number of computer users, services arid applications offered for example on the web, and of course, the amount of information being added to the web and other databases.

A search engine or search engine program is a widely used mechanism for allowing web users to search the web for information. Typically, a search engine will provide a user interface that includes a query field. In response to a query (e.g., one or more keywords describing the desired information) a user enters into the query field, the search engine will attempt to locate, rank, sort and then return for display the search results, usually as a list of hyperlinks to relevant documents.

While some search engines are "general" (e.g., www.google.com) to the extent they allow searching the web for a relatively broad range of information which may be unrelated, others may be more specialized to a particular category of search results. Sometimes such specialized search engines are referred to as "directories".

One example of a specialized search engine is a shopping/e-commerce search engine (e.g., http://.froogle.com) that only returns links to web documents that include, and may facilitate the purchase of, products relevant to a user's search query. (As used herein, "products" includes goods and/or services). Other examples of specialized search engines include without limitation news search engines, music search engines that search for music files (e.g., MP3) files, image (photo or video) search engines, advertisement (e.g., classifieds) search engines, people/personals search engines, etc. Just a few examples of specialized search engines can be found at http://www.google.com/options.

Ideally, a search engine, whether general or specialized, will provide the user with the most relevant information as quickly as possible. As mentioned, there has been an increased focus on improving the performance of search engines toward this end. For example, in a paper entitled, "The Anatomy of a Large-Scale Hypertextual Search Engine," by Sergey Brin and Larry Page, an improved method for ranking, and thus providing better, search results is described.

Although relevancy of search results has been an area of increased focus, the manner in which search results are presented to a querying user has not. For example, in many instances, both specialized and general search engines display search results (typically hyperlinks to web documents) in much the same, widely recognized manner: that is, as a vertical list of links each displayed with a "snippet" of text meant to summarize the content corresponding to the link to aid the user in assessing the relevance of each search result.

Considering as an example a product search engine, typically several pieces of information (or "cues") thought to help a user assess relevancy of each result may be displayed as part of each search result, including: (1) a picture, if available, of the product associated with a given search result link; (2) brief description ("snippet') of the associated product, which may include text from the user's query, as well as the product name, model, make, features, etc.; and (3) an indication of the vendor and/or its associated web page(s)—to which there is generally also a link—from which purchase of the product can be made or otherwise facilitated. Typically, product category and price will also be included as well.

Although the de facto "list" view for displaying search results has prevailed as the only mode of output for some time in various types of search engines, it may not be suitable in some situations. For instance, a user may not want to see all the information or type of information conveyed in response to a particular search. A user of a product search engine, for example, may only need to see a picture of products associated with each search result to assess the relevancy of that result.

Unfortunately, current search engines do not provide much, if any, flexibility in the manner in which search results are output, including the amount and type of information displayed with each search result. As such, output resources (e.g., the display size of a search result page) may be wasted on information that is not useful to a user in assessing the relevancy of each result. Such information may also unnecessarily decrease a user's efficiency in assessing search results, for example, by causing the user to scroll or otherwise go through irrelevant information which can cause fewer results to be stored on each page of results.

Thus, what is needed is an improved method and system for formatting search results for output to a user that overcomes the drawbacks of conventional search engines as described above.

SUMMARY OF THE INVENTION

Methods and systems are provided for generating search results for output in one or more formats to a user. In one embodiment, a number of "views" of search results may be provided each having particular formats. In a product search engine implementation, a grid view may be provided that allows multi-column display of product-related search results. In other implementations, a user may be able to select between multiple output modes/formats, and may even be able to select how search results should be output (e.g., what type and format of cues should be output for each search result).

DETAILED DESCRIPTION

By providing flexible methods and systems for outputting search results generated by a search engine, the present invention facilitates efficient user assessment of those results for relevancy. In one embodiment, the invention is implemented by a product search engine with which a user may search for product-related information, such as a particular product, product category, vendor/distributor, etc. In this embodiment, results may be output (either by default or by user selection) in a grid display format. In accordance with another aspect of the invention that is not limited to a product search engine, search results may be provided in a plurality of predefined output (e.g., display) formats, and optionally, a user may be able to select an output format from the predefined search result output formats. In accordance with another aspect of the invention, the type or format (including size) of cues associated with each search result may differ between the plurality of search result output formats. In accordance with yet another aspect of the invention, a mechanism is provided to allow a user to customize the output of search results generated by a search engine, for example, by specifying the type or format of cues to be output, how the results are to be output (e.g., how many columns of results should be displayed in a grid view, where advertisements, if any, should appear), etc. As such, the present invention may increase the number of results that may be displayed on a given-size search result page and/or may otherwise help users more efficiently or comfortably assess the relevancy of search results generated for output by a search engine. Other aspects, features, and benefits of the invention will be apparent from the description of one or more exemplary embodiments of the invention that follows.

Figure 1:
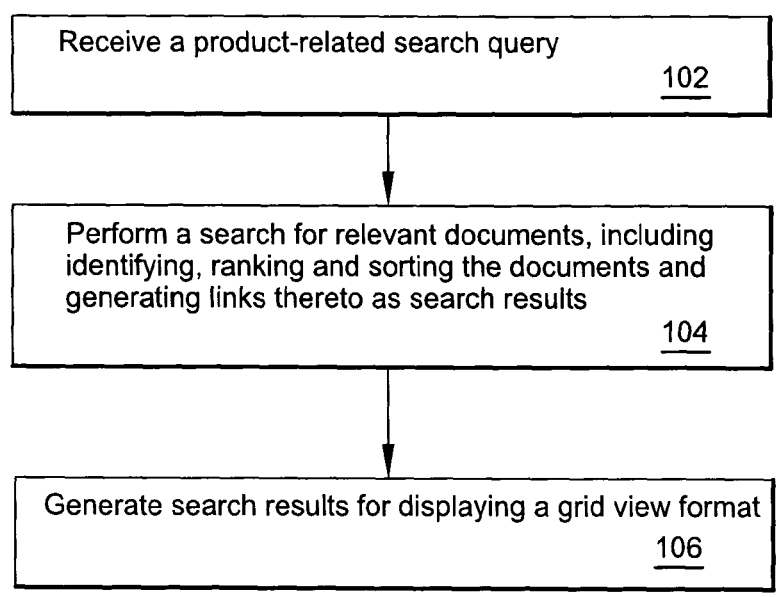
FIG. 1 is a flow diagram of a method for outputting search results, in accordance with one embodiment of the invention as implemented in a product search engine.

FIG. 1 is a flow diagram of a method for outputting search results, in accordance with one embodiment of the invention as implemented in a product search engine.

At block 102, a search engine may begin by receiving a product-related search query from a user. In the embodiment depicted in FIG. 1A, the search engine is specialized to search for product-related information in response to queries therefor.

At block 104, in response to the query, the search engine performs a search for relevant documents. In one embodiment, a particular result may include a link to a document relating to and/or facilitating the purchase of the product/category indicated by the query. The search engine, using one or combination of known search techniques, such as the one proposed by Brin and Page in the paper mentioned above, may identify, rank, and sort the most relevant results for output to a user.

At block 106, the search results may be generated for display in a grid format, i.e., in two or more columns. In one embodiment, the search results are by default generated for display to the user in a single column, list view format. Nonetheless, in this embodiment, the user can select a grid view in which the type, amount, format or other aspect of cues provided for each result differ from that of cues provided in the list format. This embodiment of the invention will be described in greater detail below with reference to FIGS. 3 and 4. In an alternative embodiment of the invention, the search results may be by default, or even exclusively, generated for display in a grid format.

Figure 2:
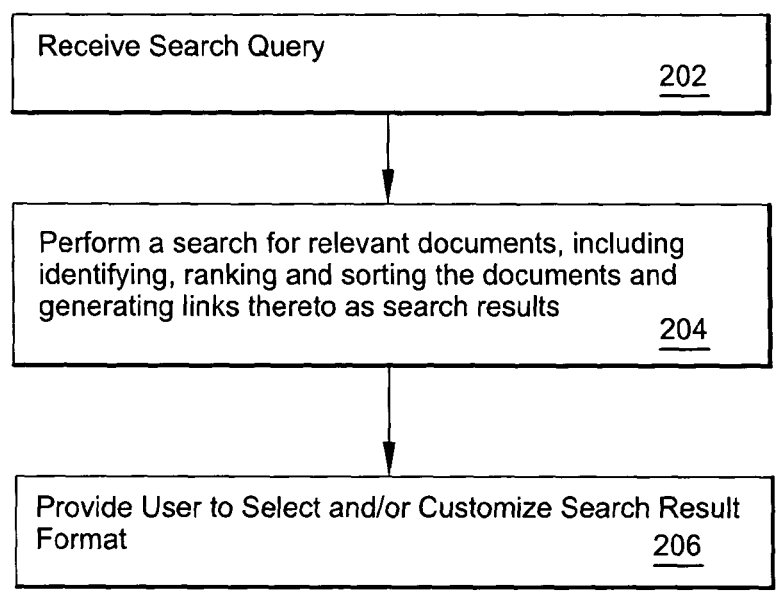
FIG. 2 is a flow diagram of a method for providing user-selectable output format of search results, in accordance with an embodiment of the invention.

FIG. 2 is a flow diagram of a method for providing user-selectable output format of search results, in accordance with an embodiment of the invention.

At block 202, a search engine may begin by receiving a search query from a user.

At block 204, in response to the query, the search engine performs a search to identify, rank, and sort relevant results.

At block 206, the search engine provides user selectivity over one or more aspects of search result output. In one embodiment, the user may select a desired output format at the time a query is entered (e.g., at block 202) and the search engine will output the search results accordingly. In an alternative embodiment, the search engine may output the search results in accordance with a predefined default output format (e.g., a single-column list), but also allow the user to view the results in a different format in which search result cues may or may not differ (e.g., in type, size, format, placement, etc.) from the cues provided in the default output format.

In another embodiment, the user may even be able to customize an output format. For example, in one embodiment, the user may select the amount, type and format of cues output for each result. For example, the user may select to have or not have displayed a graphic visual cue (e.g., a picture from a website, a picture of a product, a video still) associated with a set of results. On the other hand, the user may select to have high level and/or detailed text cues (e.g., text that includes word(s) from the query, URL, etc.) included or not included with each result. Depending on the type of search engine in which the invention is implemented, the user may further be able to selectively configure the output format of search results. As such, this embodiment of the invention may substantially increase a user's efficiency in assessing the relevancy of a set of search results. For example, a user who is only aware of, and searching based on, a particular product's appearance might select a display format that provides a cue in the form of picture for each product but does not include product model/name information, since the latter may be irrelevant and take up unnecessary space on a search result page.

Figure 3:
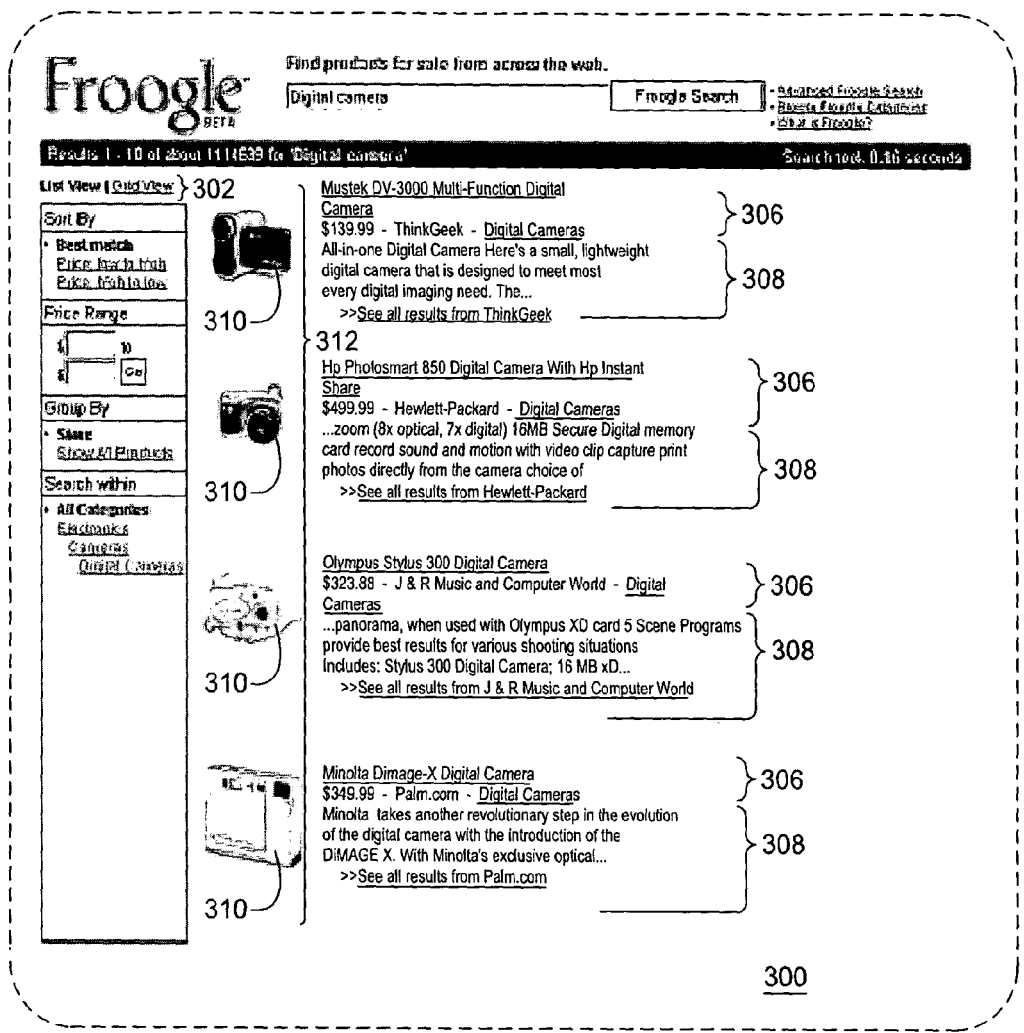
FIG. 3 is a diagram of an exemplary search result page generated for display by a product search engine, in accordance with one embodiment of the present invention.

FIG. 3 is a diagram of an exemplary search result page generated for display by a product search engine, in accordance with one embodiment of the present invention. In this embodiment of the invention, the search engine is specialized for accepting queries relating to products, product categories, sellers/distributors of products, or other information relating to products. For example, a query might be "Minolta Dimage-X" or may be more generally by a category, such as "digital camera." In one embodiment, the product search engine generates results in response to queries that primarily include links to web documents that facilitate purchase of one or more products determined to be relevant to the query. As such, a typical result in this embodiment may be a link to page of a seller's website (e.g., www.bestbuy.com). As used herein, a document is to be broadly interpreted to include any machine-readable and machine-storable work product. A document may be an email, a file, a combination of files, one or more files with embedded links to other files, etc. In the context of the Internet, a common document is a Web page. Web pages often include content and may include embedded information (such as meta information, hyperlinks, etc.) and/or embedded instructions (such as Javascript, etc.).

An exemplary search result page 300 is depicting, which displays a partial list view of search results 310 generated in response to the query, "digital camera." Each result shown on the page 300 corresponds to a product determined by the search engine to be relevant to this query and provides one or more links to a web document (in this embodiment, a "seller page" or "seller site") that the search engine determines offers that product for sale.

Each result is displayed on the result page 300 as a set of one or more cues to assist the querying user assess the relevance of the result. In the embodiment of the invention depicted in FIG. 3, each result is displayed as having a number of cues, including: (1) a picture or other graphical descriptor 310 of the product (which itself may also provide a link to the corresponding seller site); (2) a high level text descriptor 306 that, in the described embodiment, may indicate one or combination of the product category (e.g., "digital camera"), the brand and name/model of the product, the name of and link to the seller site, and the price of the product as offered by the seller site; and (3) a detailed text descriptor 308 that includes a brief, sometimes partial, description (sometimes referred to as a "snippet") relating to the product indicated by the result, and which may include one or more characters, words or phrases from the user's query. In other embodiments, result cues may have any number of other formats, information, etc.

In addition, the result page 300 includes an output selection mechanism 302. As shown in this embodiment of the invention, the output selection mechanism 302 allows selection (using hypertext links) of search result output formats—in this embodiment, as either a list view, which is shown in and described with reference to FIG. 3, or a grid view, which is shown in and described with reference to FIG. 4. Of course, it should be appreciated that in alternative embodiments, additional and/or other output formats and format selection mechanisms may be provided.

Figure 4:
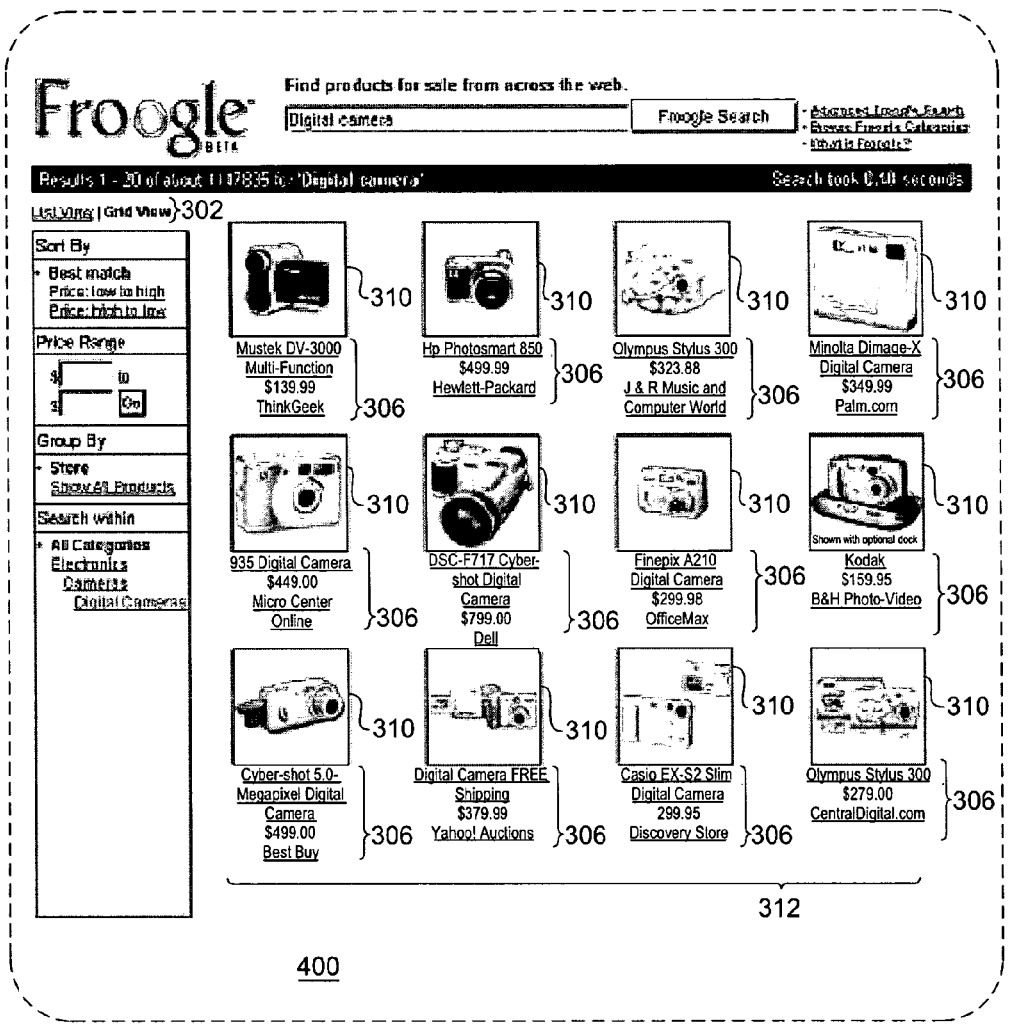
FIG. 4 is a diagram of an exemplary search result page generated for display by a product search engine, in accordance with one embodiment of the present invention.

FIG. 4 is a diagram of an exemplary search result page generated for display by a product search engine, in accordance with one embodiment of the present invention. In FIG. 4, a search result page 400 displays search results generated in response to the query, "digital camera." In contrast to the search result page 300 show in FIG. 3, the' search result page 400 generates the search results 210 for display as a grid—i.e., in two or more columns (in this embodiment, four columns of results are generated)—as opposed to the list view shown in FIG. 3 that shows search results in a single column. As such, a relatively higher number of results can be displayed to a user in a given Moreover, in the embodiment depicted in FIG. 4, each result is displayed with the picture 310 and the high level text descriptor 306, or a portion of the information thereof (as described with reference to FIG. 3) only. Thus, relative to the list view shown of results shown in FIG. 3 and generated for the same query, the detailed text descriptor 208 is not generated for display in the grid view display format. By varying in one view relative to another the cues output for a given result—in this particular embodiment, omitting in the grid display format one or more cues or portions thereof that might be displayed in the list view format (e.g., the detailed text descriptor 208)—a relatively larger number of search results may be displayed on a given search result page. This may result in more efficient assessment of results for relevancy. Of course, it will be appreciated that in alternative embodiments, various cue information can be included or excluded in alternative display/output formats; the cues shown in FIG. 3 or 4 are only exemplary of only one exemplary embodiment of the invention.

In one embodiment of the invention, a product search engine is provided that generates by default (that is, automatically in response to a query) the list display format shown in FIG. 3, but also provides a user the option to select a grid view of product-related results, for example, such as the one shown and described with reference to FIG. 4. In an alternative embodiment, a grid view format is generated by default in response to a query, subsequent to which a user may select another search result output format (e.g., a list view).

ALTERNATIVE EMBODIMENTS

FIGS. 3 and 4 are meant only to be illustrative of one or more exemplary embodiments of the invention, and in particular, an embodiment of the invention as may be implemented in a specialized search engine-specifically, one for product-related searches—for the web. Accordingly, it should be appreciated that the invention is not limited to my particular type (specialized versus general, web versus non-web) of search engine. Nor is the invention limited to any particular set of cues of search results, output (e.g., display) formats of search results and associated cues output in each format, or mode of selecting or configuring an output format.

In fact, depending on the particular application of one or more of the inventive aspects described herein, a variety of appropriate output formats, types of cues output for search results in each output format, and selection and/or configuration mechanisms of such output formats can be implemented consistent with the spirit of one or more inventive aspects described herein.

For instance, in one alternative embodiment, the invention may be employed in a search engine specialized for searching for video content (and/or documents providing or otherwise related to a query for such content) in a database of documents such as the Internet. In this embodiment, the type of cues that might be output to a user with each search result would differ from the type described with reference to the exemplary embodiment of the invention in a product search engine as described with reference to FIGS. 3 and 4.

In particular, though each result-which may be a link to a video file or document associated with a video file—might be displayed with a text descriptor (e.g., to describe the title, content, source or other aspect of the result), in this embodiment of the invention, other cues may additionally or in lieu of text or one or series of images may be displayed with a search result. For example, each result might include a video still (e.g., a photo) or an actual video clip (series of images) that plays with or without input from the user. Various search result formats can be provided to allow various types and formats of cues to be output to a user.

Moreover, in accordance with one aspect of the invention, search result output formats may be substantially more customizable than described with reference to the embodiments of the invention described with reference to FIGS. 3 and 4. For example, in one embodiment of the invention, a user may specify how results are to be displayed or otherwise output (e.g., in how many columns, whether audio-visual cues should be included, etc.), what type and format (e.g., size, output format, etc.) of search result cues are to included or excluded for output, or even how advertising or other portions of a search result page should be displayed or otherwise output (e.g., as a series of images, audio, etc.). In one embodiment, the output format is customizable only after a search is performed and results generated for output in accordance with a predefined default output format (e.g., a list view). In another embodiment, a user may be able to select how search results are to be output prior to requesting a search or entering a query.

Hardware/System Overview

Figure 5:
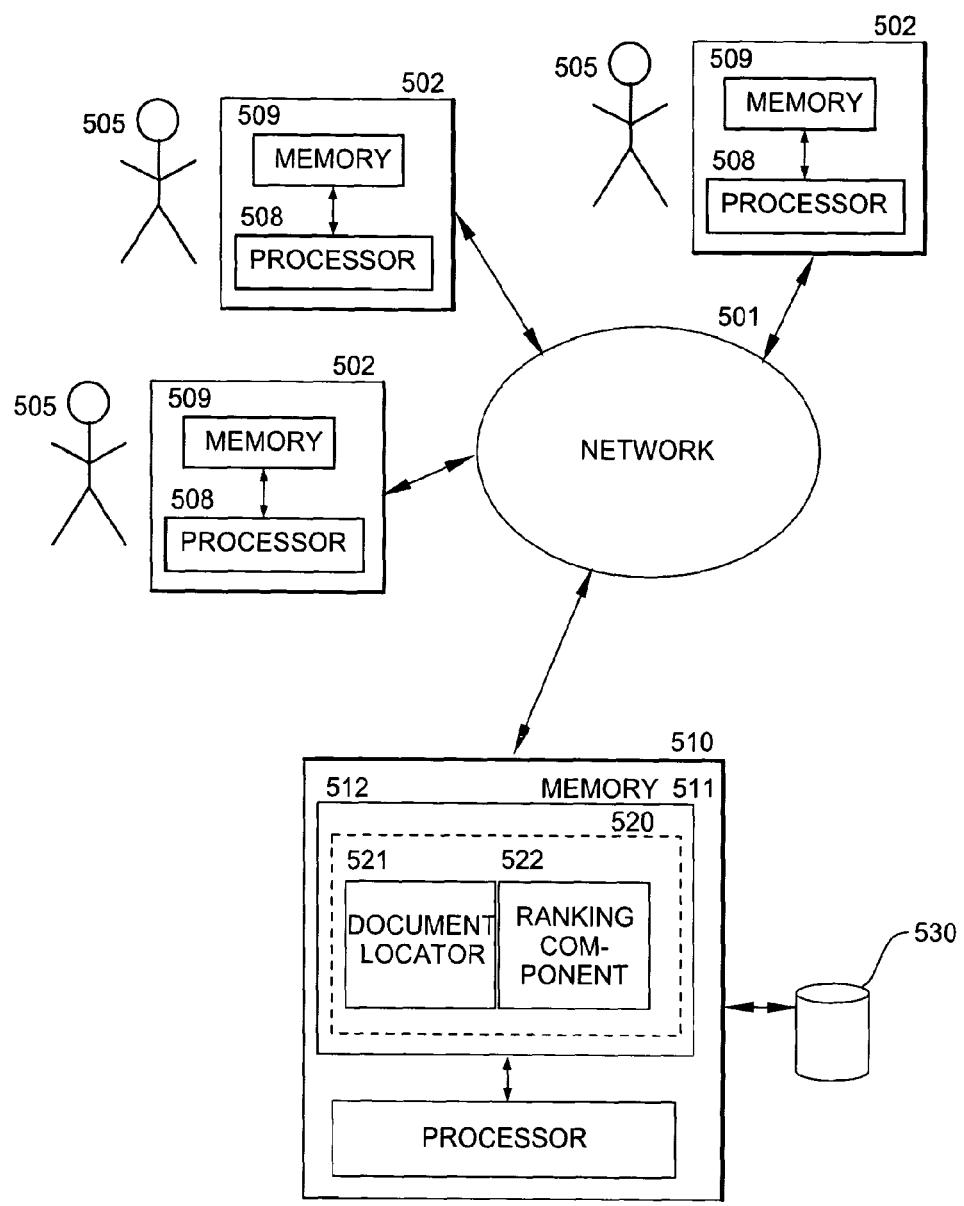
FIG. 5 is a diagram illustrating an exemplary system in which concepts consistent with the present invention may be implemented

FIG. 5 is a diagram illustrating an exemplary system in which concepts consistent with the present invention may be implemented. The system includes multiple client devices 502, a server device 510, and a network 501, which may be, for example, the Internet. Client devices 502 each include a computer-readable medium 509, such as random access memory and/or read-only memory, coupled to a processor 508. Processor 508 executes program instructions stored in memory 509. Client devices 102 may also include a number of additional external or internal devices, such as, without limitation, a mouse, a keyboard, microphone, other input user input device(s); a display, speakers, other user output device(s); a CD/DVD, diskette or other read or read-write data storage device(s).

Through client devices 502, users 505 may be able to communicate over network 501 with each other or with other systems and devices coupled to network 501, such as server device 510.

Similar to client devices 502, server device 510 may include a processor 511 coupled to a computer-readable memory 512. Server device 510 may additionally include a secondary storage element, such as database 530.

Client processors 508 and server processor 511 can be any of a number of well known computer processors. In general, client device 502 may be any type of computing platform connected to a network and that interacts with application programs, including without limitation a desktop or portable personal computer, a digital assistant or a "smart" cellular telephone or pager. Server 510, although depicted as a single computer system, may be implemented as a network of computer processors.

Memory 512 contains a search engine program 520. Search engine program 520 locates relevant information in response to search queries from users 505. In one embodiment of the invention, the search engine program 520 is specialized to search for a specific type or category of information, such as products or product categories, or music, or video, etc. In alternative embodiments, the search engine program 520 may be more general to the extent that it can be used to search for various unrelated categories of information.

Users 505 send search queries to server device 510, which responds by returning a list of relevant information, the search results, to user 505. Typically, users 505 ask server device 510 to locate documents relating to a particular topic (e.g., product-related information in the case of a product search engine implementation of the invention) and stored at other devices or systems connected to network 501. Search engine 520 includes document locator 521 and a ranking component 522. In general, document locator 521 finds a set of documents whose contents match a user search query. Ranking component 522 may rank the located set of documents based on relevance and may generate a relevance score for each document that indicates a level of relevance. Search engine 520 may then return a list of links pointing to the set of documents determined by document locator 521. The list of links may be sorted based on the relevance scores determined by ranking component 522.

The search engine 520 further includes a search result output component 523 that controls the output format (e.g., display) of the sorted search results to a user consistent with an aspect of the present invention as described herein.

Document locator 521 may initially locate documents from a document corpus stored in database 530 by comparing the terms in the user's search query to the documents in the corpus. In general, processes for indexing web documents and searching the indexed corpus of web documents to return a set of documents containing the searched terms are well known in the art. Accordingly, this functionality of document locator 521 is not described further herein.

Ranking component 522 assists search engine 520 in returning relevant documents to the user by ranking the set of documents identified by document locator 521. This ranking may take the form of assigning a numerical value, called a relevance score, corresponding to the calculated relevance of each document identified by document locator 521. There are a number of suitable ranking algorithms known in the art, one of which is described in the article by Brin and Page, as mentioned in the Background of the Invention section of this disclosure. Alternatively, the functions of ranking component 522 and document locator 521 may be combined so that document locator 521 produces a set of relevant documents each having rank values.

General

It should be appreciated that reference throughout this specification to "one embodiment" or "an embodiment" or "an aspect" of the invention means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" or "an aspect" in various portions of this specification are NOT necessarily all referring to the same embodiment. Furthermore, the particular features, structures or characteristics of one or more embodiments or aspects described may be combined or implemented independently of each other as suitable in one or more embodiments of the invention.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code—it being understood that a person of ordinary skill in the art would be able to design software and control hardware to implement the aspects based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one5' or similar language is used.

It should further be appreciated that, in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims (also as such may be amended, reissued, etc., from time to time) are hereby expressly incorporated into this Detailed Description, with each claim standing on its own as a separate embodiment of this invention.

What is claimed is:

1. A computer-implemented method for displaying product search results, the method comprising:
   receiving, from a client device, a product search query;
   transmitting, to the client device, a set of cue types as individually selectable;
   receiving, from the client device, a selection of at least one cue type from the set of individually selectable cue types, each selected cue type describing a type of product information to include in a product search result;
   performing a search based on the product search query to obtain the product search results responsive to the product search query; and
   outputting instructions to the client device for displaying the product search results responsive to the search query with each selected cue type.

2. The method of claim 1, wherein the selected cues are from a set of cues that includes two or more of the following: brief product description, graphic visual, indication of product vendor, product price, purchase page link, link to associated product web page, and product category.

3. An apparatus for generating product search results for display, the apparatus comprising:
   a storage area to store a set of instructions; and
   a processor, coupled to the storage area, to execute the instructions which cause the processor to:
   receive, from a client device, a product search query;
   transmit, to the client device, a set of cue types as individually selectable;
   receive, from the client device, selection of at least one cue type from the set of individually selectable cue types, each selected cue type describing a type of product information to include in a product search result;
   perform a search based on the product search query to obtain the product search results responsive to the product search query; and
   output instructions to the client device for displaying the product search results responsive to the search query with each selected cue type.

4. The apparatus of claim 3, wherein the selected cues are from a set of cues that includes two or more of the following: brief product description, graphic visual, indication of product vendor, product price, purchase page link, link to associated product web page, and product category.

5. A computer program product, comprising:
   a non-transitory computer-readable storage device having computer-executable program instructions embodied thereon that when executed by a computer cause the computer to display product search results, the computer-executable program instructions comprising computer-executable program instructions to:
   receive, from a client device, a product search query;
   transmit, to the client device, a set of cue types as individually selectable;
   receive, from the client device, selection of at least one cue type from the set of individually selectable cue types, each selected cue type describing a type of product information to include in a product search result;
   perform a search based on the product search query to obtain the product search results responsive to the product search query; and
   output instructions to the client device for displaying the product search results responsive to the search query with each selected cue type.

6. The computer program product of claim 5, wherein the selected cues are from a set of cues that includes two or more of the following: brief product description, graphic visual, indication of product vendor, product price, purchase page link, link to associated product web page, and product category.

* * * * *

UNITED STATES PATENT AND TRADEMARK OFFICE
CERTIFICATE OF CORRECTION

PATENT NO. : 8,739,061 B1  
APPLICATION NO. : 13/163413  
DATED : May 27, 2014  
INVENTOR(S) : Craig Nevill-Manning and Pearl Renaker Page 1 of 1

It is certified that error appears in the above-identified patent and that said Letters Patent is hereby corrected as shown below:

On the Title Page:

(75) Inventors; should read --

Craig Nevill-Manning

Signed and Sealed this
Seventeenth Day of March, 2015

Michelle K. Lee
*Director of the United States Patent and Trademark Office*